H. BLUMENBERG.
PROCESS OF EXTRACTING POTASSIUM FROM MINERALS.
APPLICATION FILED APR. 3, 1916.
1,214,003.
Patented Jan. 30, 1917.
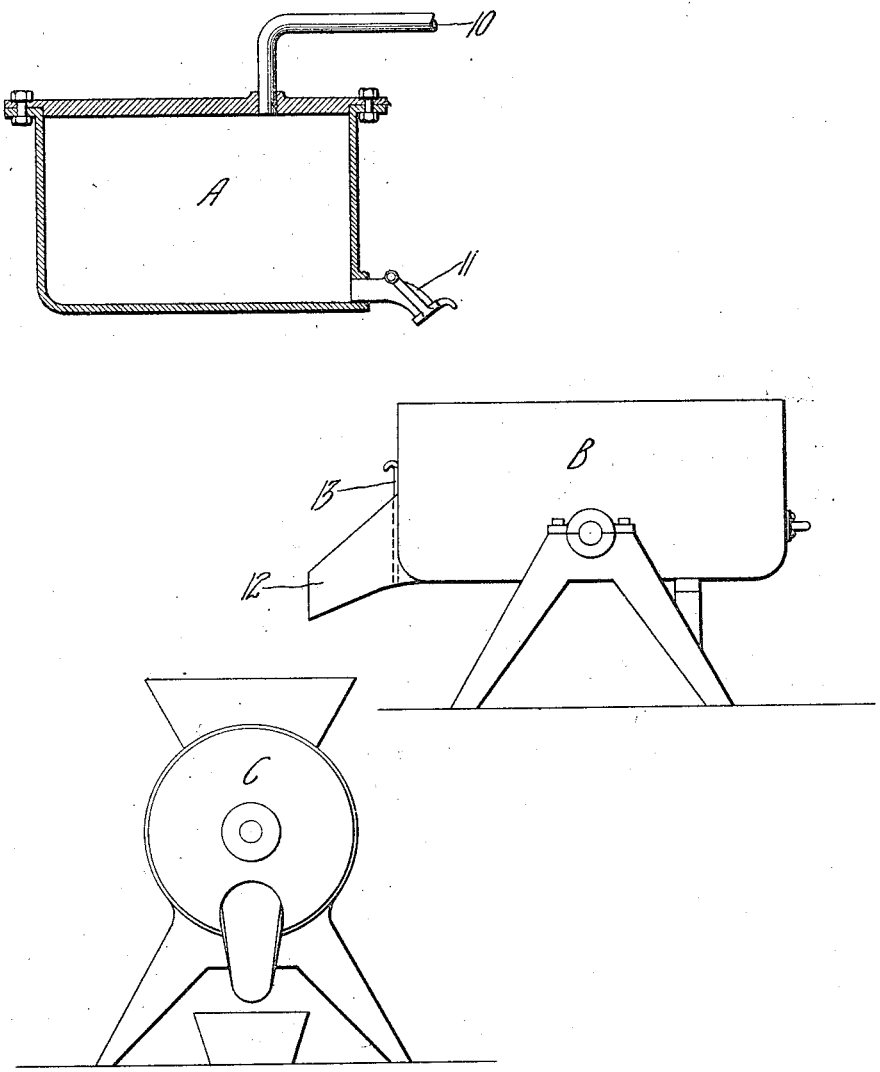
Inventor
Henry Blumenberg,
by Hazard Berry & Mills
his Attorneys.

UNITED STATES PATENT OFFICE.

HENRY BLUMENBERG, OF LOS ANGELES, CALIFORNIA, ASSIGNOR TO ELLIOTT B. MAPEL, TRUSTEE, OF NEW YORK, N. Y.

PROCESS OF EXTRACTING POTASSIUM FROM MINERALS.

1,214,003.  Specification of Letters Patent.  Patented Jan. 30, 1917.

Application filed April 3, 1916. Serial No. 88,644.

*To all whom it may concern:*

Be it known that I, HENRY BLUMENBERG, a citizen of the United States, residing at Los Angeles, in the county of Los Angeles and State of California, have invented new and useful Improvements in Processes of Extracting Potassium from Minerals, of which the following is a specification.

My invention relates to a process of extracting potassium from minerals and in particular from feldspar and the like, and similar potassium containing minerals.

As well known, potassium is essential to plant life, and consequently potassium must be supplied to soil used for agricultural and horticultural purposes, if the soil is deficient therein. The great source of potassium minerals commercially available are the great polyhalite, kieserite, carnallite, etc., deposits at Stassfurt, Germany, which by the well known process of conversion and separation by crystallization have hitherto supplied by far the largest percentage of potassium containing fertilizers. Various attempts have been made to discover other deposits of similar potassium containing minerals, or of devising processes whereby potassium may be extracted on a commercial scale from minerals containing considerable quantities of potassium, such as feldspar. The last named mineral, especially in the form of orthoclase, $Al_2O_3.3SiO_2.K_2O.3SiO_2$, contains approximately 15 per cent. of potassium oxid $K_2O$, the usual form in which potassium is calculated. Unfortunately feldspar is very refractory and does not yield the potassium contained therein by treatment with acid and the like. It has been proposed to mix the feldspar with reagents in order to convert the potassium aluminum silicate into a product amenable to the treatment of acids so that potassium could be extracted thereby. However, the methods hitherto proposed require a very high temperature for the conversion of the feldspar into the compounds from which by appropriate treatment, the potassium could be obtained. The result has been that none of the methods proposed have been a commercial success.

My invention consists in the discovery that when a nitrate of an alkali metal or alkaline earth metal is fused with feldspar, the decomposition of the latter occurs at a remarkably low heat at which the nitric oxids are liberated and a sodium potassium aluminum silicate is formed.

By my process, I effect the decomposition of the feldspar at a lower temperature than any other known process. The base of the nitrate decomposing the feldspar liberates valuable gases which may be absorbed by hydrated lime forming a lime nitrate which is often more valuable than the nitrate used in the decomposition. Or the nitrogen oxids liberated in the process may be converted into nitric acid or any other suitable nitrate that market conditions may indicate as being the most profitable.

My process will be better understood with the aid of the accompanying drawings which illustrate diagrammatically the apparatus used for carrying out my process.

I take orthoclase pulverized by suitable means so that the same will pass through a 200 mesh screen and sodium nitrate pulverized in the same manner and mix the two intimately, in equal proportions. The mixture is introduced in a closed crucible $a$ preferably made of cast iron and subjected to a heat from 1200 to 1500 degrees F., until complete fusion takes place. The nitric oxid fumes are withdrawn through the pipe 10 and may be utilized for making nitric acid by the well known process or absorbed by lime to form a calcium nitrate. The heating is continued until no more nitric oxids are liberated, which usually requires about thirty minutes, when the reaction will be completed. The reaction takes place approximately as follows:

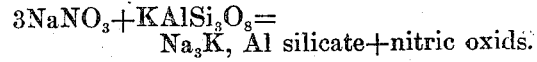
$3NaNO_3 + KAlSi_3O_8 =$
$Na_3K, Al$ silicate $+$ nitric oxids.

By taking the above proportions of orthoclase and sodium nitrate, three atoms of sodium will be added to form a complex sodium potassium aluminum silicate which is the end product in the crucible $a$. The fused silicate is withdrawn from the converter $a$ through the valved outlet pipe 11 into the cooler $b$ preferably mounted on trunnions and provided with a discharge chute 12 controlled by a gate or slide valve 13. The solid material after being broken up to pass through the discharge chute 12 is conveyed to a mill $c$ of any suitable or preferred construction. The complex silicate after pulverization is a valuable commercial fertilizer containing potassium in soluble form, said fertilizer material containing from 7 to 10 per cent. of $K_2O$, potassium oxid.

The potassium may be extracted from the sodium potassium alkaline silicate by treatment with sulfuric acid which will extract the sodium, potassium and aluminum forming their sulfates and leaving the insoluble silicates behind. The mixture of the sulfates just mentioned produces a valuable fertilizer material and may be used as such or the purification of the potassium may be continued and potassium sulfate may be separated from the aluminum and sodium sulfates by the well known methods of crystallization. The potassium sulfate will be the end product and may be used as such or may be converted into any other suitable potassium salt.

While I have described the treatment of orthoclase with sodium nitrate, similar nitrates such as potassium nitrate or lime nitrate may be used. The reaction temperature when nitrates other than sodium nitrate are employed, varies, being uniformly higher than in the case where sodium nitrate is used. I do not limit myself to the exact proportions of the nitrate and the orthoclase as stated. When the proportion of orthoclase to nitrate is increased, a higher reaction temperature is required. Furthermore, the complex silicate formed is not so easily soluble as when equal parts of the nitrate and orthoclase are taken.

As will be understood by those skilled in the art, the soluble silicate may be treated with other acids besides sulfuric acid. Any other mineral or organic acid may be used in rendering the potassium contained in the silicate available.

While I have disclosed the preferred method of rendering potassium in feldspars and similar materials available for fertilizing purposes or of extracting the same by means of acids, I do not confine myself to the exact details as described, nor of the proportions indicated, as various changes may be made by those skilled in the art without departing from the spirit of my invention as defined in the appended claims.

I claim:

1. A process of converting a refractory potassium containing mineral to render the potassium amenable to the treatment with acids, comprising mixing equal parts of powdered sodium nitrate and powdered orthoclase, subjecting the mixture to a temperature of 1200 to 1500 degrees F. in a closed chamber until the liberation of nitric oxids ceases, drawing the fused mass from the closed chamber, cooling and grinding the same and treating the ground material with sulfuric acid, drawing off the solution from the unsoluble mass and separating the potassium sulfate from the other sulfates by crystallization.

2. A process of extracting potassium from potassium containing minerals, comprising mixing equal parts of powdered sodium nitrate and powdered feldspar, subjecting the mixture to a temperature of 1200 to 1500 degrees F. in a closed chamber until the liberation of nitric oxids ceases, cooling and grinding the fused mass and treating the ground material with a mineral acid.

3. In a process of extracting potassium from potassium containing minerals comprising mixing equal parts of a nitrate of an alkali metal or alkaline earth metal and powdered feldspar, heating the mixture in a closed chamber until the liberation of nitric oxids ceases, cooling and grinding the fused mass and subjecting the ground material to the action of a mineral acid, separating the liquid from the unsoluble parts and separating the potassium salt from the other salts by crystallization.

4. A process of extracting potassium from potassium containing minerals, comprising mixing a powdered nitrate of an alkali metal or alkaline earth metal and powdered feldspar, subjecting the mixture to a temperature sufficient to drive off the nitric oxids and to fuse the mass in a closed chamber, cooling and grinding the fused mass, treating the ground material with sulfuric acid, separating the liquid from the insoluble parts and separating the potassium salt from the other salts by crystallization.

5. A process of rendering potassium in a refractory potassium containing mineral available as a commercial fertilizer, comprising mixing equal parts of a powdered nitrate of an alkali metal or an alkaline earth metal and powdered feldspar, heating the mixture in a closed chamber until the liberation of nitric oxids ceases, cooling and grinding the fused mass and treating the same with a mineral acid.

6. A process of rendering potassium contained in a refractory material available as a commercial fertilizer, comprising mixing a powdered nitrate of an alkali metal or alkaline earth metal with powdered feldspar, subjecting the mixture to a temperature sufficient to liberate the nitric oxids and to fuse the mass, cooling and grinding said mass and treating the same with a mineral acid.

7. A process of rendering potassium contained in a refractory material available as a commercial fertilizer, comprising mixing a powdered nitrate of an alkali metal or alkaline earth metal with powdered feldspar, subjecting the mixture to a temperature sufficient to liberate the nitric oxids and to fuse the mass, and cooling and grinding said mass.

8. A process of rendering potassium contained in a refractory potassium containing material available for commercial fertilizers, comprising mixing a nitrate of an alkali metal or alkaline earth metal with a refractory potassium containing mineral, subjecting the mixture to a temperature sufficient to liberate the nitric oxids and to fuse the mass in a closed chamber, cooling and grinding the mass and treating the same with a mineral acid.

9. A process of rendering the potassium contained in a refractory potassium containing material available for commercial fertilizer, comprising mixing a nitrate of an alkali metal or alkaline earth metal and a potassium containing refractory mineral, subjecting the mixture to a temperature sufficient to liberate the nitric oxids and to fuse the mass, and cooling and grinding said mass.

In testimony whereof I have signed my name to this specification.

HENRY BLUMENBERG.